Patented Feb. 3, 1925.

1,524,838

UNITED STATES PATENT OFFICE.

ADOLF FRIEDRICH MÜLLER, OF MUNSTER, WESTPHALIA, GERMANY.

DEVICE FOR SEPARATING THE CONSTITUENT PARTS OF HETEROGENEOUS MIXTURES.

Application filed February 7, 1921. Serial No. 443,144.

*To all whom it may concern:*

Be it known that I, ADOLF FRIEDRICH MÜLLER, a citizen of Germany, residing at 21, Junkerstrasse, Munster, Westphalia, Germany, have invented certain new and useful Improvements in Devices for Separating the Constituent Parts of Heterogeneous Mixtures (for which I have filed application in Germany Feb. 10, 1919, Switzerland March 9, 1920, Italy June 18, 1920, France June 19, 1920, and England June 28, 1920), of which the following is a specification.

My invention relates to an apparatus for separating the constituent parts of heterogeneous mixtures especially for the purpose for recovering the still combustible elements of the residues of furnace installations, by the aid of the hydrostatic action of a liquid possessing a greater density than a portion of the constituents of which the mixture is composed, and hence causing a separation of these said constituents according to their specific gravity. One feature of the invention, resides in the arrangement of at least two superposed conveyors dipping into a vessel containing the separating liquid, and adapted to receive the constituent elements for separating them in the liquid, at various levels thereof and raising them, entirely separated from each other, above the level of the liquid, and delivering them as required.

Another feature of the invention is the employment of a receptacle or tank having its greatest depth at one end thereof, the tendency of the heavier constituent parts of heterogeneous mixtures being to settle at the deepest end of the receptacle.

Another feature is the employment of a plurality of superposed conveyors having different level reaches relative to the liquid in the receptacle, the greatest depth of said conveyors below the level of the liquid being at the deepest end of the receptacle, and the lowermost of the conveyors being adjacent to the bottom of the receptacle and the reach thereof extending to the greatest depth of the liquid in the receptacle.

One embodiment of the subject matter of my invention, comprising two superposed worms as conveyors, is shown by way of example in the accompanying drawing, in which—

Figure 1:
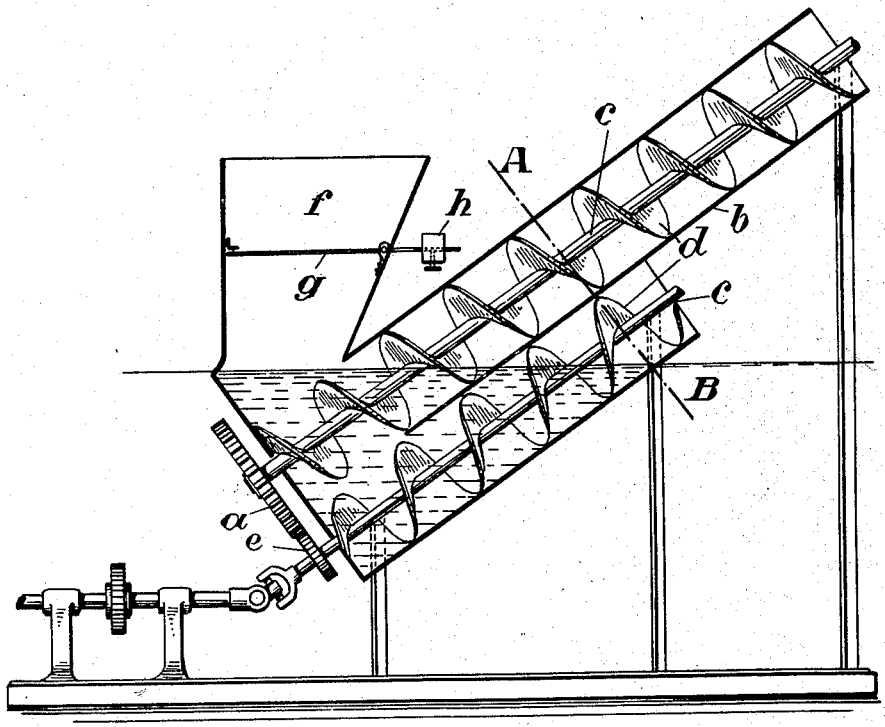
Fig. 1 is a vertical section through the axis of the worms.
Figure 2:
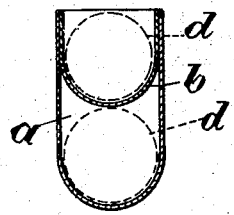
Fig. 2 is a cross section along line A—B in Fig. 1.

Within the liquid container which is provided at the upper portion of one of its ends with a charging funnel $f$, there are arranged two worms $d$, the inclined superposed axes $c$ of which are substantially parallel with the inclined under side of the container. At one of their ends the said worms are adapted to support two interengaging toothed wheels $e$ of unequal size, of which the smaller is mounted on the lower worm axis, driven by a counter shaft through the intervention of a joint coupling. In this arrangement, the worms possess an opposite direction of rotation relatively to each other, and are so constructed as to be able to run counter to each other in order to deliver in the same direction. The troughs in which the worms are lodged, the sectional shape of which is disclosed in Fig. 2, project beyond the level of the separating liquid contained within the receptacle $a$. In the form illustrated, the upper trough extends beyond the lower, so that the discharge points for the two worms are separated from each other. If preferred, the worms may be made equally long, provided care be taken that the material delivered by each conveyor worm, be discharged separately, say, for example, through downwardly inclined chutes conducting to different points. The bottom $b$ of the upper trough is provided with apertures or openings which may, if thought expedient, extend beyond the level of the liquid. The lower end of the bottom $b$ of the upper trough does not extend down to the left hand wall of the container, but at the most to a point lying vertically below the right hand edge of the feed opening, so that this opening will not thereby be impeded. The lower portion or bottom of the trough of the lower conveyor worm constitutes the bottom of the liquid container as well.

A valve $g$ is rotatably disposed within the charging funnel $f$ which, and owing to the provision of a counter weight $h$, will as a rule bear up against a stop arranged within the funnel, and effect the closure thereof. As soon as a certain quantity of working material has been filled in, the weight is overbalanced and the valve drops, and thus causes the material to at once fall into the container $a$. This latter is filled to a little below the lower edge of the discharge end of the lower worm with the separating liquid. This latter consists of a liquid which is considerably heavier than water, and also possesses a higher specific gravity than the lighter constituents about to be separated from the working material. The liquids suitable for the purpose specified will be found to be the salt solutions, such as the lyes produced in the manufacture of potash and dilute molasses. A more suitable fluid mixture however, for the purpose specified, will be a liquid having a saturated content of pulverulent materials, such as pulverized clay, lime, chalk, brickdust, and any other finely divided earthy materials. Of the constituent elements of the working material the heavier, such as stones, solid clinkers, etc., will at once sink to the bottom in the separating liquid, the threads of the upper worm presenting no obstacle whatever. They thereupon collect in the lower tapering portion of the container, are here caught up by the lower worm, raised above the level of the liquid, and discharged at the right hand end of the device. The lighter constituents, such as fragments of coke and unburnt coal, besides other substances which may still be used, such as bits of wood, tanning bark, cotton waste, leather-cuttings, and the like will keep more to the surface, or may perhaps in part even slowly sink down in the liquid in proportion as they are penetrated by the same. All these floating masses are received by the upper worm, raised out of the liquid, and moved across the perforated bottom of the trough $b$ to the discharge opening of the same and are thus separately discharged from the machine. As the material is being raised within the worm casing, the liquid carried along has ample opportunity to flow off, running partly through the gaps between the worm and the trough, partly through the sieve-like bottom of said trough, and thus again joining the liquid in the container. By this arrangement there is obtained a two-fold advantage, on the one hand, waste of the separating liquid is prevented and the necessity of arranging a special device for the recovery thereof is obviated; on the other hand, the material is discharged in such a dry state that for manifold purposes it may be directly employed without requiring any further preparation.

Since the lower worm is adapted to rotate at a greater speed than the upper, it will obviously deliver more liquid. As a result there takes place a continual circulation of the liquid from the lower trough through the openings in the bottom of the upper trough, within this latter, and thence again back to the container. At the same time the liquid is thoroughly agitated and stirred, thereby securing an equable and uniform distribution of the clay or other masses, so that the liquid will permanently retain the same density, a fact of prime importance for a proper separating process. In this connection it has been discovered that, owing to the undulating motion of the liquid which is caused by the rotation of the worms and which to a certain extent produces an additional lifting action, the actual separating process is very considerably enhanced.

A further advantage embodied in the use of worms as conveyors resides in the feature that the restarting of the device after a break, during which—where turbid liquids, such as a clay, or the like containing liquid are employed as separating means—the fairly solid sediment which may form itself at the bottom of the container, will be acted upon with comparative ease. It is understood, however, that my invention is in no way restricted to the use of worms as means to extract the separated constituents from a liquid, and to cause their discharge from the containers or receptacles.

If necessary, there may be arranged three or even more conveyors, one above the other, in the place of the two shown by way of example, namely in all cases where more than two heavy constitutents of different weight are to be separated from the working material. This will particularly be the case where, as frequently happens, the said material contains besides rock, solid clinkers, coke and unburnt fragments of coal, also porous slag and spongy coke. In such a contingency, on three worms being arranged, the one uppermost would be used to select and convey the last-mentioned constitutents, the intermediate worm the good coke and the unburnt fragments of coal, in other words, the most valuable materials, while the lowermost worm would be employed to clear away the fragments of rock and the heavy clinkers. In most cases, however, it will be found advisable for the purpose of effecting a separation among more than two constituents, not to erect the worms in a common container, but to make use of a plurality of sets, arranged in a series, each set being provided with two conveyors, and the receptacle of the one set always containing a heavier separating liquid than that of the set immediately preceding. It will thus be seen that the structure in accordance with this invention likewise offers in the case of such a series arrangement substantial advantages over and above the constructions already known.

The apparatus is intended primarily for the recovering of such elements of the residues of furnace installations which are still combustible. It is, however, obvious that it will be equally applicable for working up other mixtures still containing valuable constituents, such as workshop sweepings, waste cuttings of divers kind, for the separation of the very light particles of pumicestone for the purpose of pottery trade, and the like.

Having thus described my invention, it should be understood that there may be modifications thereof and variations therein without departing from the spirit of the invention or exceeding the scope of the appended claims.

I claim:—

1. An apparatus for obtaining a fuel from the residues of furnace installations, comprising: a receptacle; a separating fluid in the receptacle, adapted to separate in a hydrostatic way the slaggy constituents of the residues from the coke-like constituents; said receptacle having a feeding hopper and a point of greater depth to receive said slaggy constituents; a plurality of superimposed conveyors each of them slantingly extending into said receptacle and adapted to separately seize and discharge said different constituents; the lower end portions of both said conveyors being disposed between said feeding hopper and said point of greater depth without substantially impeding the slaggy constituents from sinking down to said point of greater depth; and means to operate said conveyors.

2. An apparatus for obtaining a fuel from the residues of furnace installations, comprising: a receptacle; a separating fluid in the receptacle, adapted to separate in a hydrostatic way the slaggy constituents of the residues from the coke-like constituents; said receptacle having a feeding opening and a point of greatest depth to receive the slaggy constituents; a conveyor extending into said receptacle down to said point of greatest depth and adapted to seize and discharge said slaggy constituents; a second conveyor beneath said feeding opening and extending into said receptacle and ending on a level higher than the deepest point of said first named conveyor, and adapted to seize and discharge said coke-like constituents; means adjacent to said second conveyor to confine the coke-like constituents within the reach of the second conveyor; a substantially free passage between said feeding opening and said point of greatest depth; and means to operate said conveyors.

3. An apparatus for separating the constituents of heterogeneous mixtures, with the aid of the hydrostatic action of liquid, said apparatus comprising, a receptacle having a point of greatest depth for liquid; separating-liquid in the receptacle having a specific gravity intermediate the specific gravities of the constituents of the mixture; means for feeding material into said liquid; a plurality of superposed rotatable conveyors extending into the receptacle and into said liquid with their axes substantially in the same plane, the conveyors having different level reaches relative to said liquid; the lowermost conveyor being adjacent to the bottom of the receptacle and the reach thereof extending to the point of greatest depth of the liquid in the receptacle; means for rotating the conveyors, the lowermost conveyor being rotated in direction opposite to that of the next superposed conveyor; and a trough located between the lowermost conveyor and the conveyor next thereabove, the trough extending beneath the surface of said liquid but not to the lower ends of the conveyors so that an unobstructed space is left for subsidence and flotation of solids in the liquid, said trough having perforations through the lower portion; the lowermost conveyor when rotated causing passage of said liquid through the perforations in said trough and conducing to circulation of the liquid in the receptacle.

4. An apparatus for obtaining a fuel from the residues of furnace installations, comprising: a receptacle; a separating fluid in the receptacle, adapted to separate in a hydrostatic way the slaggy constituents of the residues from the coke-like constituents; said receptacle having a feeding opening and a point of greatest depth to receive the slaggy constituents, a conveyor extending into said receptacle down to said point of greatest depth and adapted to seize and discharge said slaggy constituents; a second conveyor beneath said feeding opening and extending into said receptacle and ending on a level higher than the deepest point of said first named conveyor, and adapted to seize and discharge said coke-like constituents; a partition adjacent said second conveyor and separating it from the first named conveyor; a substantially free passage between said feeding opening and said point of greatest depth; and means to operate said conveyors.

5. An apparatus for separating the constituents of heterogeneous mixtures with the aid of the hydrostatic action of a liquid, said apparatus comprising a receptacle having a point of greatest depth for liquid; the bottom of the receptacle being inclined downwardly to said point of greatest depth; separating-liquid in the receptacle having a specific gravity intermediate the specific gravities of the constituents of the mixture;

means for feeding material into said liquid; a plurality of superposed rotatable conveyors arranged at an incline corresponding to the incline of said bottom extending without obstruction between their lower ends into the receptacle and into said liquid; means for rotating the conveyors, the lowermost conveyor being rotated in direction opposite to that of the next superposed conveyor; and a trough located between the lowermost conveyor and the conveyor next thereabove, said trough being arranged at an incline corresponding to the incline of said conveyors and extending beneath the surface of said liquid but not to the lower ends of the conveyors so that an unobstructed space is left for subsidence and flotation of solids in the liquid, said trough having perforations through the extending portion; the conveyors having different level reaches relative to said liquid; the greatest depth of the conveyor below the level of the liquid being at the deepest part of the receptacle; the lowermost conveyor being adjacent to the botttom of the receptacle and the reach thereof extending to the point of greatest depth of the liquid in the receptacle; the lowermost conveyor when rotated causing passage of said liquid through the perforations in said trough and conducing to circulation of the liquid in the receptacle and retention by said liquid of its density.

6. An apparatus for separating the coke-like constituents of the residues of furnace installations from the slaggy constituents proper with the aid of the hydrostatic action of a liquid, comprising; a receptacle having a feeding opening and a point to assemble the slaggy constituents beneath said opening; separating fluid in said receptacle; a conveyor extending into said receptacle and reaching to said assembling point; a second conveyor extending into said receptacle on to beneath said feeding opening without any obstruction between its lower end and the lower end of said first named conveyor which would prevent the subsidence and flotation of the solid material within said liquid; and means to operate said conveyors.

7. An apparatus for separating the coke-like constituents of the residues of furnace installations from the slaggy constituents proper with the aid of the hydrostatic action of a liquid, comprising: a receptacle having a feeding opening; separating fluid in said receptacle; means beneath said opening to assemble the slaggy constituents sinking down within said fluid; two inclined superimposed conveyors within said receptacle, one of said conveyors extending down to said assembling means, the other one extending down beneath said opening without causing an obstruction between said opening and the lower end of the lower one of said conveyors; and means to operate said conveyors.

8. An apparatus for separating the constituents of heterogeneous mixtures with the aid of the hydrostatic action of a liquid, said apparatus comprising a receptacle having a point of greatest depth for liquid; separating liquid in the receptacle having a specific gravity intermediate the specific gravities of the constituents of the mixture; means for feeding material into said liquid; a plurality of superposed rotatable worms extending into the receptacle and into said liquid; the worms having different level reaches relatively to said liquid; the lowermost worm being adjacent to the bottom of the receptacle and the reach thereof extending to the point of greatest depth of the liquid in the receptacle; means for rotating the worms, one of said worms being rotated in direction opposite to that of the adjacent worm; and a trough located between the lowermost worm and the worm next thereabove, the trough extending beneath the surface of said liquid for a portion of its length but not far enough to intervene between the lower ends of said worms whereby an unobstructed space is provided for subsidence and flotation of solids in the liquid; the said worms causing circulation of the liquid in the receptacle.

9. An apparatus for separating the constituents of heterogeneous mixtures with the aid of the hydrostatic action of liquid, said apparatus comprising a receptacle having a point of greatest depth for liquid; separating-liquid in the receptacle having a specific gravity intermediate the specific gravities of the constituents of the mixture; means for feeding material into said liquid; a plurality of superposed rotatable worms extending into the receptacle and into said liquid; the worms having different level reaches relatively to said liquid; the lowermost worm being adjacent to the bottom of the receptacle and the reach thereof extending to the point of greatest depth of the liquid in the receptacle; means for rotating the worms, one of said worms being rotated in direction opposite to that of the adjacent worm; and a trough located between the lowermost worm and the worm next thereabove, the trough extending beneath the surface of said liquid for a portion of its length but not far enough to intervene between the lower ends of said worms whereby an unobstructed space is provided for subsidence and flotation of solids in the liquid, said trough having perforations through its lower portion; the lowermost worm when rotated causing passage of said liquid through the perforations in said trough and conducing to the circulation of the liquid in the receptacle.

10. Separating apparatus comprising in combination a tank containing a liquid having a specific gravity intermediate the specific gravities of the constituents of the material to be separated, said tank having an inclined bottom a pair of screw conveyors in the tank one above the other and extending in substantially the same direction, and a trough between said conveyors in which the upper conveyor operates, the lower ends of both conveyors projecting into the separating liquid without any direct obstruction between their lower ends preventing the subsidence and flotation of material in said liquid said tank being provided with a feed opening above the lower end of the upper conveyor whereby the lower conveyor will remove the heavier material and the upper conveyor the lighter material without interfering with the subsidence of the heavier material to the lower conveyor.

11. The apparatus of claim 10 in which the wall of the tank at the lower end of the inclined bottom is inclined oppositely to the inclination of the bottom in combination with feeding means which directs incoming material against said inclined end.

12. In separating apparatus the combination of a tank to contain a separating liquid having a specific gravity intermediate the specific gravities of the materials to be separated, a pair of inclined conveyors the lower ends of which project into the liquid in the tank to different levels and without any obstruction between their lower ends preventing the subsidence and flotation of material in the liquid and means for continuously feeding the material into the liquid in said tank toward the submerged ends of the conveyors along an inclined path of opposite inclination to that of the conveyors, whereby the lighter particles may rise in the liquid without interference by the incoming material.

13. In separating apparatus the combination of a trough-shaped tank with an inclined curved bottom and containing a liquid having a specific gravity intermediate the specific gravities of the materials to be separated, a pair of screw conveyors in said tank having diameters substantially the same as the width of the tank and arranged one above the other with the lower conveyor close to said curved inclined bottom, a trough-like partition between said conveyors with which the upper conveyor cooperates, and which does not extend to the lower ends of the same whereby an unobstructed space is provided for the subsidence and flotation of the material in said liquid, and means for feeding material into the end of the tank adjacent the lower ends of the conveyors.

14. The apparatus of claim 13 in which the wall of the vessel at the lower end of said inclined bottom is inclined in the opposite direction to the inclination of the bottom and the feeding means arranged to feed the material upon said inclined end wall.

15. An apparatus for obtaining a fuel from the residues of furnace installations, comprising: a receptacle; a separating fluid in the receptacle, adapted to separate in a hydrostatic way the slaggy constituents of the residues from the coke-like constituents; said receptacle having a feeding hopper and a point of greater depth to assemble the said slaggy constituents; an inclined side wall adjacent said point of greater depth; a conveyor extending into said receptacle down to said point of greater depth; a worm slantingly disposed above said conveyor within said receptacle, the lower end of the worm being adjacent the lower end of said conveyor; a partition between said worm and said conveyor, extending down to a point spaced from said side wall, so as to leave a substantially free passage between said hopper and the lower end of said conveyor; and means to operate said conveyor and said worm.

16. An apparatus for obtaining a fuel from the residues of furnace installations, comprising; a trough-like inclined receptacle; separating fluid in said receptacle; two superimposed worms having substantially parallel inclined axes commonly disposed within said receptacle adjacent each other; the lower end portion of the upper one of said worms passing over the lower end of the other worm; a partition between said worms adjacent to both of them; and means to operate said worms.

17. An apparatus for separating the constituents of heterogeneous mixtures with the aid of the hydrostatic action of a liquid, comprising; a receptacle having a point of greater depth for liquid; separating liquid in the receptacle having a specific gravity intermediate the specific gravities of the constituents of the mixture; means for feeding material to said liquid; two superimposed worms obliquely extending into said receptacle and into said liquid, the lower end portion of the upper worm being disposed immediately above the lower end of the lower worm; a free passage between the lower end portions of said worms to allow the heavier constituents of the mixture to sink to said point of greater depth; and means to operate said worms.

18. An apparatus for separating the constituents of heterogeneous mixtures with the aid of the hydrostatic action of a liquid, comprising: a receptacle having a point of greater depth for liquid; separating liquid in the receptacle having a specific gravity intermediate the specific gravities of the constituents of the mixture; means for feeding material to said liquid; two superimposed worms obliquely extending into said receptacle and into said liquid, the lower end portion of the upper worm being disposed immediately above the lower end of the lower worm; a free passage between the lower end portions of said worms to allow the heavier constituents of the mixture to sink to said point of greater depth; and means to rotate the worms in a different sense.

19. An apparatus for obtaining a fuel from the residues of furnace installations, comprising: a trough-like inclined receptacle; separating fluid in said receptacle; two superimposed worms having inclined axes, commonly disposed within said receptacle adjacent each other; the lower end portion of the upper one of said worms passing over the lower end of the other worm; a partition between said worms adjacent to both of them; and means to rotate the worms in a different sense.

20. An apparatus for obtaining a fuel from the residues of furnace installations, comprising: a trough-like inclined receptacle; separating fluid in said receptacle; two superimposed worms having substantially parallel inclined axes commonly disposed within said receptacle adjacent each other; the lower end portion of the upper one of said worms extending beyond the lower end of the other worm; a partition between said worms adjacent to both of them; and means to rotate the lower worm faster than the upper one.

21. An apparatus for separating the constituents of heterogeneous mixtures with the aid of the hydrostatic action of a liquid, comprising: a receptacle having a point of greater depth for liquid; separating liquid in the receptacle having a specific gravity intermediate the specific gravities of the constituents of the mixture; means for feeding material to said liquid; two superimposed worms obliquely extending into said receptacle and into said liquid, the lower end portion of the upper worm being disposed immediately above the lower end of the lower worm; a free passage between the lower end portions of said worms to allow the heavier constituents of the mixture to sink to said point of greater depth; and means to rotate the upper worm in one direction and the lower one in the other direction and with a greater speed.

22. An apparatus for separating the constituents of heterogeneous mixtures with the aid of the hydrostatic action of a liquid, said apparatus comprising a receptacle having a point of greater depth for liquid; separating liquid in the receptacle having a specific gravity intermediate the specific gravities of the constituents of the mixture; means for feeding material into said liquid; two superimposed rotatable worms extending into the receptacle and into said liquid, without any direct obstruction between their lower ends preventing the subsidence and flotation of the material in said liquid; the worms having different level reaches relatively to said liquid; the lowermost worm being adjacent to the bottom of the receptacle and the reach thereof extending to the point of greater depth of the liquid in the receptacle; a perforated partition between the worms and adjacent the upper one; and means for rotating the worms, one of said worms being rotated in a direction opposite to that of the adjacent worm; the worms when rotated causing a circulation of the liquid in the receptacle.

23. In an apparatus for separating the differently heavy constituents of heterogeneous mixtures with the aid of a separating liquid, the combination of: a tank having a feeding hopper and a point to assemble the heavier constituents; a separating liquid in said tank, having a density intermediate the specific gravities of the constituents to be separated; two longitudinally superimposed conveyors extending into the tank and into said liquid, the reach of the lowermost of said conveyors extending to said assembling point, the reach of the uppermost conveyor extending beyond the lower end of the lowermost conveyor and beneath said feeding hopper without any obstruction preventing the subsidence and flotation of the material in said liquid; and means for operating the conveyors.

24. In an apparatus for separating the differently heavy constituents of heterogeneous mixtures with the aid of a separating liquid, the combination of: a tank having a feeding hopper and a point to assemble the heavier constituents; a separating liquid in said tank, having a density intermediate the specific gravities of the constituents to be separated; a conveyor extending into the tank and down to said assembling point; a second conveyor obliquely disposed in said tank and extending with its lower end portion to a point substantially vertically above the lower end portion of said first named conveyor without any obstruction preventing the subsidence and flotation of the material in said liquid; and means for operating the conveyors.

25. In an apparatus for separating the differently heavy constituents of heterogeneous mixtures with the aid of a separating liquid the combination of: a tank having a feeding hopper and a point to assemble the heavier constituents; a separating liquid in said tank, having a density intermediate the specific gravities of the constituents to be separated; a conveyor extending into the tank and down to said assembling point; a second conveyor obliquely disposed in said tank and extending with its lower end portion to a point substantially vertically above the lower end portion of said first named conveyor without any obstruction preventing the subsidence and flotation of the material in said liquid; a partition between said conveyors and adjacent to said second conveyor; and means for operating the conveyors.

In testimony whereof I affix my signature in presence of two witnesses.

ADOLF FRIEDRICH MÜLLER.

Witnesses:
H. ANGERKAMEN,
OTTO LEY.